(12) United States Patent
Xia

(10) Patent No.: US 10,911,918 B2
(45) Date of Patent: Feb. 2, 2021

(54) ACCESS METHOD, DEVICE, AND SYSTEM

(71) Applicant: Huawei Technologies Co., Ltd., Guangdong (CN)

(72) Inventor: Yongjun Xia, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 34 days.

(21) Appl. No.: 16/147,420

(22) Filed: Sep. 28, 2018

(65) Prior Publication Data
US 2019/0037378 A1    Jan. 31, 2019

Related U.S. Application Data

(63) Continuation of application No. PCT/CN2017/076828, filed on Mar. 15, 2017.

(30) Foreign Application Priority Data

Mar. 29, 2016  (CN) .......................... 2016 1 0188124

(51) Int. Cl.
*H04W 4/70* (2018.01)
*H04W 12/08* (2009.01)
(Continued)

(52) U.S. Cl.
CPC ........... *H04W 4/70* (2018.02); *H04L 12/2807* (2013.01); *H04L 63/0876* (2013.01);
(Continued)

(58) Field of Classification Search
CPC ....... H04W 4/70; H04W 12/08; H04W 84/12; H04W 88/16; H04L 12/2807; H04L 63/0876
See application file for complete search history.

(56) References Cited

U.S. PATENT DOCUMENTS 8,462,748 B2    6/2013   Henry et al.
2011/0090886 A1  4/2011   Park et al.
(Continued)

FOREIGN PATENT DOCUMENTS

CN    1578487 A    2/2005
CN    1988489 A    6/2007
(Continued)

OTHER PUBLICATIONS

Zhang, Wei et al., "Access Technique of the Internet of Things Gateway", Journal of Nanyang University, vol. 9, No. 12, Dec. 31, 2010, pp. 68-70. (partial translation).

*Primary Examiner* — Zhiren Qin
*Assistant Examiner* — Mohammed M Murshid
(74) *Attorney, Agent, or Firm* — Leydig, Voit & Mayer, Ltd.

(57) ABSTRACT

Embodiments of the present invention provide an access method to implement access of an IoT gateway. A specific solution includes: UE obtains an address of the to-be-connected IoT gateway. An IoT cloud platform allocates, to the MAPP installed on the UE, a unique access identifier corresponding to the MAPP. The UE provides an address of the IoT cloud platform and the allocated access identifier for the IoT gateway whose address is already learned. The IoT gateway adds the access identifier to a registration message, and sends the registration message to the IoT cloud platform. The IoT cloud platform binds the IoT gateway to the MAPP corresponding to the access identifier included in the registration message, so as to complete access of the IoT gateway.

11 Claims, 9 Drawing Sheets

(51) Int. Cl.
*H04L 29/06* (2006.01)
*H04L 12/28* (2006.01)
*H04W 84/12* (2009.01)
*H04W 88/16* (2009.01)

(52) U.S. Cl.
CPC ............ *H04W 12/08* (2013.01); *H04W 84/12* (2013.01); *H04W 88/16* (2013.01)

(56) References Cited

U.S. PATENT DOCUMENTS

| | | |
|---|---|---|
| 2012/0254961 A1 | 10/2012 | Kim et al. |
| 2014/0089478 A1 | 3/2014 | Seed et al. |
| 2015/0229605 A1 | 8/2015 | Wu et al. |
| 2015/0319006 A1 | 11/2015 | Plummer et al. |
| 2015/0319046 A1 | 11/2015 | Plummer et al. |
| 2016/0055469 A1* | 2/2016 | Kim .................. H04L 41/0806 705/21 |
| 2016/0081133 A1* | 3/2016 | Kim et al. |
| 2017/0155703 A1* | 6/2017 | Hao ....................... H04L 67/12 |
| 2018/0324170 A1* | 11/2018 | Chen ...................... G06F 21/44 |
| 2019/0014004 A1* | 1/2019 | Horiuchi |

FOREIGN PATENT DOCUMENTS

| | | |
|---|---|---|
| CN | 101163073 A | 4/2008 |
| CN | 201657327 U | 11/2010 |
| CN | 102577581 A | 7/2012 |
| CN | 102739570 A | 10/2012 |
| CN | 103580968 A | 2/2014 |
| CN | 103731756 A | 4/2014 |
| CN | 104052759 A | 9/2014 |
| CN | 105897523 A | 8/2016 |
| WO | 2015080553 A1 | 6/2015 |

\* cited by examiner

ACCESS METHOD, DEVICE, AND SYSTEM

CROSS-REFERENCE TO RELATED APPLICATIONS

This application is a continuation of International Application No. PCT/CN2017/076828 filed on Mar. 15, 2017, which claims priority to Chinese Patent Application No. 201610188124.6 filed on Mar. 29, 2016. The disclosures of the aforementioned applications are hereby incorporated by reference in their entireties.

TECHNICAL FIELD

The present application relates to the communications field, and in particular, to an access method, a device, and a system.

BACKGROUND

An Internet of Things (IoT) is a vast network formed by combining various information sensing devices and the Internet, and is intended to connect all objects and the network together, facilitating identification and management.

FIG. 1 shows a networking model of an IoT. As shown in FIG. 1, an IoT terminal (an IoT sensor such as a camera or a sensor), an IoT gateway, an IoT cloud platform, and a mobile application (MAPP) are successively located from the lowermost layer to the uppermost layer. The IoT terminal is connected to the IoT gateway by using a wireless protocol, and communicates with the IoT cloud platform through the Internet after gateway aggregation. The IoT cloud platform is responsible for connecting various gateways, storing the IoT terminal and a status of the IoT terminal, and then pushing information about the gateways and information about the IoT terminal to the MAPP through the Internet, to connect all objects and the network together.

To implement the foregoing IoT functions, during IoT deployment, a user first purchases a gateway and an IoT terminal from a smart home service provider. After the gateway accesses an IoT cloud platform, the user may install an MAPP on user equipment (UE), to control and view the IoT terminal.

Currently, during gateway production, an address (an Internet Protocol (IP) address or a domain name) of an IoT cloud platform is usually preset in a gateway and a unique identifier of the gateway is usually built in the gateway. After the gateway is powered on, a registration message carrying the unique identifier of the gateway is automatically sent to the IoT cloud platform based on the preset address of the IoT cloud platform. If no user enters the unique identifier of the gateway in the registration message after logging in to the IoT cloud platform by using the MAPP, gateway registration fails, and the registration message is resent to the IoT cloud platform until a user enters the unique identifier of the gateway in the registration message. Therefore, the IoT cloud platform binds the MAPP to the gateway, and the gateway successfully accesses the IoT cloud platform.

It can be learned that, in a current IoT access manner, because an address of an IoT cloud platform is preset in a gateway in an access process, if a plurality of IoT cloud platforms are deployed in an IoT, a plurality of versions of the gateway are required to correspond to the IoT cloud platforms, thereby causing much inconvenience to all of production and marketing of the gateway and use of a user, and causing low compatibility of the IoT gateway. In addition, the gateway repeatedly initiates registration to the IoT cloud platform, thereby occupying a large quantity of IoT cloud platform resources, and degrading processing performance of the IoT cloud platform.

SUMMARY

Embodiments of the present invention provide an access method, an apparatus, and a system, to implement access of an IoT gateway with no requirement for a version of the IoT gateway, reduce IoT cloud platform resources, and improve compatibility of the IoT gateway and processing performance of an IoT cloud platform.

To achieve the foregoing objective, the following technical solutions are used in the present invention.

According to a first aspect of the present invention, an access method is provided, applied to UE, where an MAPP in an IoT is installed on the UE, and the method includes:

accessing, by the UE, a local area network of an IoT gateway according to an operation of a user of the UE, in other words, accessing, by the UE, the same local area network as the IoT gateway;

sending, by the UE in the local area network accessed by both the UE and the IoT gateway, a multicast probe message used to search for a gateway;

after sending the multicast probe message, receiving, by the UE, a multicast response message that is sent by the connectable IoT gateway in the local area network and that includes an address of the IoT gateway;

after sending the multicast probe message, obtaining, by the UE, an address of an IoT cloud platform in to which the UE logs and an access identifier that is allocated by the IoT cloud platform to the MAPP on the UE and that corresponds to the MAPP on the UE; and sending, by the UE, to the IoT gateway sending the multicast response message, based on the address of the IoT gateway in the multicast response message, the address of the IoT cloud platform in to which the UE logs by using the MAPP and the access identifier that is allocated by the IoT cloud platform and that corresponds to the MAPP, so that the IoT gateway sends, to the IoT cloud platform in to which the UE logs by using the MAPP, a registration message carrying the access identifier, and accesses the IoT cloud platform.

In this way, when receiving the registration message that is sent by the IoT gateway and that carries the access identifier, the IoT cloud platform in to which the UE logs by using the MAPP binds the IoT gateway sending the registration message to the MAPP corresponding to the access identifier carried in the registration message, so as to complete access of the IoT gateway.

To sum up, in the solution of the access method provided in the present invention, the UE on which the MAPP is installed and the to-be-connected IoT gateway access the same local area network, so that the UE obtains the address of the to-be-connected IoT gateway by using a multicast message function of the local area network. The IoT cloud platform allocates, to the MAPP on the UE, the unique access identifier corresponding to the MAPP, so that the IoT gateway bound to the MAPP performs access. The UE provides, for the IoT gateway whose address is already learned, the address of the IoT cloud platform and the access identifier allocated by the IoT cloud platform to the MAPP, so that the IoT gateway obtains the address of the IoT cloud platform, adds, to the registration message, the access identifier that is sent by the UE and that corresponds to the MAPP, and sends the registration message to the IoT cloud platform. The IoT cloud platform binds the IoT gateway sending the registration message to the MAPP corresponding to the access identifier included in the registration message, so as to complete access of the IoT gateway. In the access process, because the address of the IoT cloud platform is obtained by the UE and is then provided for the IoT gateway, there is no requirement for a version of the IoT gateway in the access process, facilitating all of production and marketing of the gateway and use of the user, so that compatibility of the IoT gateway is substantially improved. In addition, the IoT gateway initiates registration to the IoT cloud platform once only when the IoT gateway receives the address of the IoT cloud platform and the access identifier allocated by the IoT cloud platform to the MAPP, and the address and the access identifier are sent by the UE. Therefore, IoT cloud platform resources are greatly reduced, and processing performance of the IoT cloud platform is improved.

The address of the IoT cloud platform is an address that can be used to uniquely identify the IoT cloud platform. The address of the IoT cloud platform may be an IP address or a domain name address. Certainly, the address of the IoT cloud platform may be alternatively another address. This is not specifically limited in this embodiment of the present invention.

With reference to the first aspect, in a possible implementation of the first aspect, the accessing, by the UE, a local area network of an IoT gateway may be implemented in the following manner:
accessing, by the UE, a wireless local area network, e.g., a WiFi (Wireless Fidelity) local area network, provided by the IoT gateway, where in this implementation, the IoT gateway needs to have a routing function; or
accessing, by the UE, a wireless local area network accessed by the IoT gateway, where the wireless local area network accessed by the IoT gateway may be a wireless local area network provided by an upper-layer router of the IoT gateway in the network, or may be a wireless local area network provided by the IoT gateway.

With reference to either the first aspect or the foregoing possible implementation, in another possible implementation of the first aspect, before obtaining the address of the IoT cloud platform and the access identifier allocated by the IoT cloud platform, receiving, by the UE, an indication that is entered by the user of the UE in the MAPP, and logging in to the IoT cloud platform.

Optionally, the indication entered by the user may be an account number, a password, and a login instruction, or other information that can be used for logging in to the IoT cloud platform.

According to a second aspect of the present invention, another access method is provided, applied to an IoT gateway, and including:

receiving, by the IoT gateway in a local area network, a multicast probe message that is sent by UE on which an MAPP is installed and that is used to search for a gateway, and sending, by the IoT gateway, a multicast response message including an address of the IoT gateway to the UE sending the multicast probe message; and then receiving, by the IoT gateway, an address, which is sent by the UE, of an IoT cloud platform in to which the UE logs and an access identifier that is allocated by the IoT cloud platform to the MAPP installed on the UE and that corresponds to the MAPP; and sending, by the IoT gateway to the IoT cloud platform in to which the UE logs by using the MAPP, a registration message carrying the access identifier corresponding to the MAPP installed on the UE.

The registration message is used by the IoT cloud platform in to which the UE logs by using the MAPP to bind, to the MAPP corresponding to the access identifier carried in the registration message, the IoT gateway sending the registration message, to complete access, to the IoT cloud platform in to which the UE logs by using the MAPP, of the IoT gateway sending the registration message.

In this way, when receiving the registration message that is sent by the IoT gateway and that carries the access identifier, the IoT cloud platform in to which the UE logs by using the MAPP binds the IoT gateway sending the registration message to the MAPP corresponding to the access identifier carried in the registration message, so as to complete access of the IoT gateway.

To sum up, in the solution of the access method provided in the present invention, when receiving the multicast probe message sent by the UE in the same local area network, the IoT gateway provides the address of the IoT gateway for the UE by using a multicast message function of the local area network. The UE provides, for the IoT gateway whose address is already learned, the obtained address of the IoT cloud platform in to which the UE logs by using the MAPP and the access identifier allocated by the IoT cloud platform to the MAPP, so that the IoT gateway obtains the address of the IoT cloud platform, adds the access identifier corresponding to the MAPP to the registration message, and sends the registration message to the IoT cloud platform. The IoT cloud platform binds the IoT gateway sending the registration message to the MAPP corresponding to the access identifier included in the registration message, so as to complete access of the IoT gateway. In the access process, because the address of the IoT cloud platform is obtained by the UE and is then provided for the IoT gateway, there is no requirement for a version of the IoT gateway in the access process, facilitating all of production and marketing of the gateway and use of a user, so that compatibility of the IoT gateway is substantially improved. In addition, the IoT gateway initiates registration to the IoT cloud platform once only when the IoT gateway receives the address of the IoT cloud platform and the access identifier that are sent by the UE. Therefore, IoT cloud platform resources are greatly reduced, and processing performance of the IoT cloud platform is improved.

With reference to the second aspect, in a possible implementation of the second aspect, the local area network is Wi-Fi local area network provided for the IoT gateway; or the local area network is Wi-Fi local area network accessed by the IoT gateway, where the Wi-Fi local area network accessed by the IoT gateway may be Wi-Fi local area network provided by an upper-layer router of the IoT gateway in the network, or may be Wi-Fi local area network provided by the IoT gateway.

According to a third aspect, the present invention provides still another access method, applied to an IoT cloud platform, and including:

receiving a registration message that is sent by an IoT gateway and that includes an access identifier; binding, to an MAPP corresponding to the access identifier included in the registration message, the IoT gateway sending the registration message; and after binding the IoT gateway to the MAPP, sending, by the IoT cloud platform to the IoT gateway, a registration response message used to indicate that the IoT gateway successfully accesses the IoT cloud platform.

The IoT cloud platform allocates, to the MAPP used to perform login, the unique access identifier corresponding to the MAPP, so that the IoT gateway bound to the MAPP performs access, and the IoT cloud platform records a correspondence between the unique access identifier and the IoT gateway. The access identifier in the registration message sent by the IoT gateway is provided by UE, on which the MAPP is located, for the IoT gateway after the IoT cloud platform allocates the access identifier to the MAPP.

In this way, when receiving the registration message that is sent by the IoT gateway and that carries the access identifier, the IoT cloud platform binds the IoT gateway sending the registration message to the MAPP corresponding to the access identifier carried in the registration message, so as to complete access of the IoT gateway.

To sum up, in the solution of the access method provided in the present invention, the IoT cloud platform binds the IoT gateway sending the registration message to the MAPP corresponding to the access identifier included in the registration message, so as to complete access of the IoT gateway. In the access process, because the access identifier carried in the registration message sent by the IoT gateway to the IoT cloud platform is allocated by the IoT cloud platform to the MAPP, the IoT gateway needs to send the registration message only once, and in this case, the IoT cloud platform can bind, to the MAPP corresponding to the access identifier carried in the registration message, the IoT gateway sending the registration message, to complete access of the IoT gateway. Therefore, IoT cloud platform resources are greatly reduced, and processing performance of the IoT cloud platform is improved.

With reference to the third aspect, in a possible implementation of the third aspect, when receiving the registration message that is sent by the IoT gateway and that carries the access identifier, the IoT cloud platform may specifically bind, in the following manner, the IoT gateway to the MAPP corresponding to the access identifier included in the registration message:

first determining whether the MAPP corresponding to the access identifier carried in the registration message is already bound to a gateway; and if the MAPP corresponding to the access identifier carried in the registration message is not bound to a gateway, directly binding, to the MAPP corresponding to the access identifier carried in the registration message, the IoT gateway sending the registration message; or if the MAPP corresponding to the access identifier carried in the registration message is already bound to a gateway, first unbinding, from an original gateway, the MAPP corresponding to the access identifier carried in the registration message, and then binding, to the MAPP corresponding to the access identifier carried in the registration message, the IoT gateway sending the registration message.

If the MAPP corresponding to the access identifier carried in the registration message is not bound to a gateway, it indicates that the MAPP corresponding to the access identifier carried in the registration message is used for the first time for logging in to the IoT cloud platform, to perform access of the IoT gateway. Therefore, there is no binding relationship, and the MAPP may be directly bound to the IoT gateway.

If the MAPP corresponding to the access identifier carried in the registration message is already bound to a gateway, it indicates that the MAPP corresponding to the access identifier carried in the registration message has been used before for logging in to the IoT cloud platform, to perform access of the IoT gateway. Therefore, a binding relationship exists. The current registration message may be sent by a new IoT gateway with which an original gateway is replaced due to a failure of the original gateway, or may be sent by an original gateway to perform access again after the original gateway is restored.

With reference to either the third aspect or the foregoing possible implementation, in another possible implementation of the third aspect, the method further includes:

when receiving a login of the MAPP installed on the UE, allocating, by the IoT cloud platform to the MAPP, the access identifier corresponding to the MAPP, and sending the allocated access identifier and an address of the IoT cloud platform to the UE.

The MAPP installed on the UE is any MAPP that is used for logging in to the IoT cloud platform.

According to a fourth aspect, UE is provided, where an MAPP is installed on the UE, and the UE includes:

an access unit, configured to access a local area network of an IoT gateway;

a sending unit, configured to send a multicast probe message in the local area network, where the multicast probe message is used to search for a gateway;

a receiving unit, configured to receive a multicast response message that is sent by the IoT gateway and that includes an address of the IoT gateway; and an obtaining unit, configured to obtain an address of the IoT cloud platform and an access identifier allocated by the IoT cloud platform to the MAPP, where the sending unit is further configured to send, to the IoT gateway based on the address of the IoT gateway in the multicast response message received by the receiving unit, the address of the IoT cloud platform and the access identifier that are obtained by the obtaining unit, so that the IoT gateway sends, to the IoT cloud platform based on the address of the IoT cloud platform, a registration message carrying the access identifier, and accesses the IoT cloud platform.

Specifically, for a specific implementation of the fourth aspect, refer to the behavioral functions of the UE in the access method provided in the first aspect or the possible implementations of the first aspect. Therefore, effects that are the same as those of the first aspect can be achieved. Details are not described herein again.

According to a fifth aspect, an IoT gateway is provided, including:

a receiving unit, configured to receive, in a local area network, a multicast probe message sent by UE, where the multicast probe message is used to search for a gateway, and an MAPP is installed on the UE; and a sending unit, configured to: when the multicast probe message sent by the UE is received, send a multicast response message including an address of the IoT gateway to the UE, where the receiving unit is further configured to receive an address of a first IoT cloud platform and an access identifier allocated by the first cloud platform to the MAPP, where the address and the access identifier are sent by the UE, and the first IoT cloud platform is an IoT cloud platform in to which the UE logs by using the MAPP; and the sending unit is further configured to send, to the first IoT cloud platform based on the address of the first IoT cloud platform that is received by the receiving unit, a registration message carrying the access identifier, where the registration message is used by the first IoT cloud platform to bind the IoT gateway to the MAPP, to complete access of the IoT gateway to the first IoT cloud platform.

Specifically, for a specific implementation of the fifth aspect, refer to the behavioral functions of the IoT gateway in the access method provided in the second aspect or the possible implementations of the second aspect. Therefore, effects that are the same as those of the second aspect can be achieved. Details are not described herein again.

According to a sixth aspect, an IoT cloud platform is provided, including:

- a receiving unit, configured to receive a registration message that is sent by an IoT gateway and that includes a first access identifier;
- a binding unit, configured to bind, to an MAPP corresponding to the first access identifier, the IoT gateway sending the registration message received by the receiving unit; and
- a sending unit, configured to send a registration response message to the IoT gateway, where the registration response message indicates that the IoT gateway successfully accesses the IoT cloud platform.

Specifically, for a specific implementation of the sixth aspect, refer to the behavioral functions of the IoT cloud platform in the access method provided in the third aspect or the possible implementations of the third aspect. Therefore, effects that are the same as those of the third aspect can be achieved. Details are not described herein again.

According to a seventh aspect, an access system is provided, including:

- at least one UE in any one of the fourth aspect and the possible implementations;
- at least one IoT gateway in any one of the fifth aspect and the possible implementations; and
- at least one IoT cloud platform in any one of the sixth aspect and the possible implementations.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may derive other drawings from these accompanying drawings without creative efforts.

FIG. 6-1 and FIG. 6-2 are a schematic flowchart of an access method according to an embodiment of the present invention;

FIG. 6A-1 and FIG. 6A-2 are a schematic flowchart of another access method according to an embodiment of the present invention;

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

A basic principle of the present invention is: In an Internet of Things, UE on which an MAPP is installed and a to-be-connected IoT gateway first access a same local area network, so that the UE is connected to and communicates with the IoT gateway by using a multicast function of the local area network. When receiving a login of the MAPP installed on the UE, an IoT cloud platform allocates a unique access identifier to the MAPP. The UE communicates through a directly established connection to the IoT gateway, and provides, for the IoT gateway, a learned address of the IoT cloud platform and the access identifier allocated by the IoT cloud platform to the MAPP. The IoT gateway learns of the address of the IoT cloud platform, and may send, to the IoT cloud platform, a registration message carrying the access identifier corresponding to the MAPP on the UE. The IoT cloud platform binds the IoT gateway sending the registration message to the MAPP corresponding to the access identifier included in the registration message, so as to complete access of the IoT gateway. In this way, there is no need to have a requirement for a version of the IoT in the access process of the IoT gateway. The address, which is required by the IoT gateway to initiate registration, of the IoT cloud platform is provided by the UE that is in the local area network and on which the MAPP is installed. When receiving the address of the IoT cloud platform and the access identifier that are provided by the UE, the IoT gateway needs to initiate registration to the IoT cloud platform only once to complete access. Therefore, access of the IoT gateway has no requirement for the version of the IoT gateway, IoT cloud platform resources are reduced, and compatibility of the IoT gateway and processing performance of the IoT cloud platform are improved.

Implementations of the present invention are described below in detail with reference to the accompanying drawings.

Figure 2:
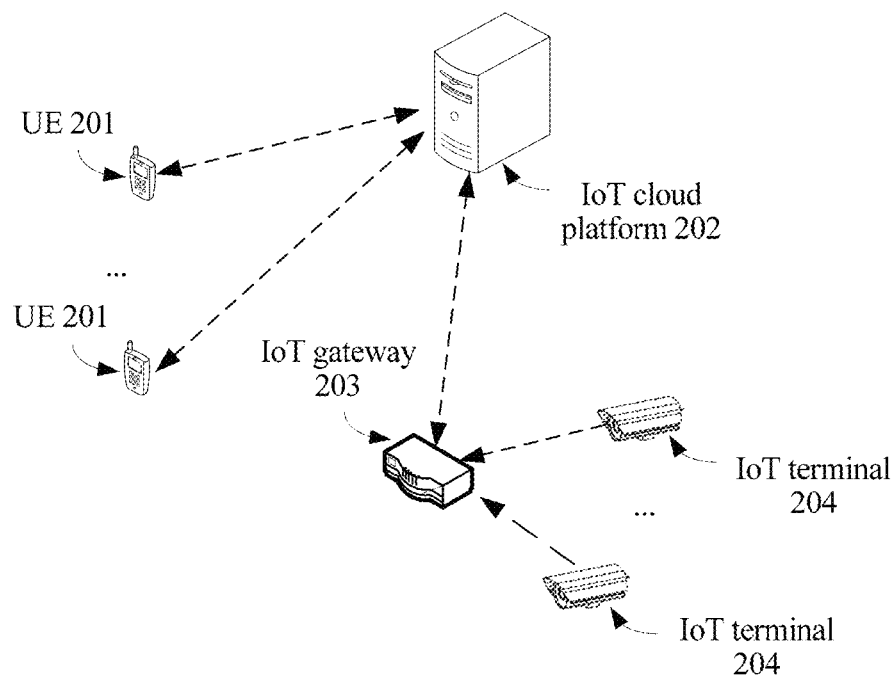
FIG. 2 is a schematic diagram of a network architecture according to an embodiment of the present invention.

As shown in FIG. 2, FIG. 2 is a simplified schematic diagram of a network architecture to which the present invention may be applied. The network architecture may include at least one UE 201 on which an MAPP is installed, an IoT cloud platform 202, at least one IoT gateway 203, and at least one IoT terminal 204.

The at least one UE 201 may be a mobile phone, a tablet computer, a notebook computer, an ultra-mobile personal computer (UMPC), a netbook computer, a personal digital assistant (PDA), or the like. A type of the UE is not specifically limited in the present invention.

The IoT cloud platform 202 may be a server, or may be a cloud device. This is not specifically limited in this embodiment of the present invention. The IoT cloud platform 202 is responsible for connecting various IoT gateways 203, storing the IoT terminal 204 and a status of the IoT terminal 204, and then pushing information about the IoT gateways 203 and information about the IoT terminal 204 to the MAPP on the UE 201 according to a binding relationship, to connect all objects and a network together.

Figure 1:
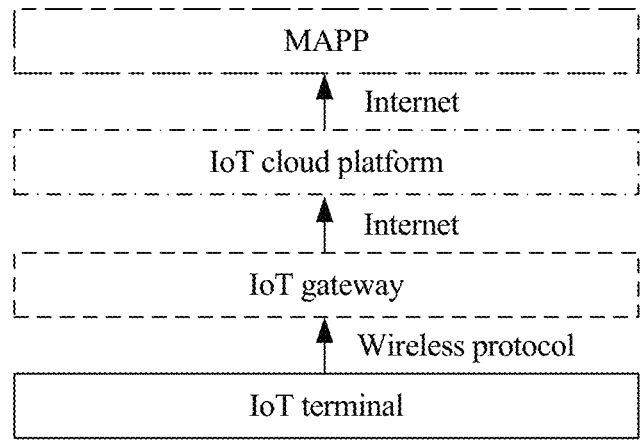
FIG. 1 is a networking model of an Internet of Things according to the prior art.

Each of the at least one IoT gateway 203 is the same as the IoT gateway in FIG. 1. Each IoT gateway 203 is connected to at least one lower-layer IoT terminal 204 by using a wireless protocol, and communicates with the IoT cloud platform 202 through the Internet after the at least one IoT terminal 204 is aggregated, so that the IoT cloud platform 202 pushes information about the IoT gateway 203 and information about the IoT terminal 204 to the MAPP on the UE 201 according to the binding relationship, to connect all objects and the network together. In the IoT cloud platform 202, one IoT gateway 203 may be bound to at least one MAPP.

The at least one IoT terminal 204 may be a radio frequency identification apparatus, an infrared sensor, a global navigation satellite system, a laser scanner, or the like. This is not specifically limited in this embodiment of the present invention.

It should be noted that FIG. 2 shows only an example of a quantity of UEs, a quantity of IoT gateways, and a quantity of IoT terminals in this embodiment of the present invention. There may be any quantity of UEs, any quantity of IoT gateways, and any quantity of IoT terminals based on an actual application scenario.

Figure 3:
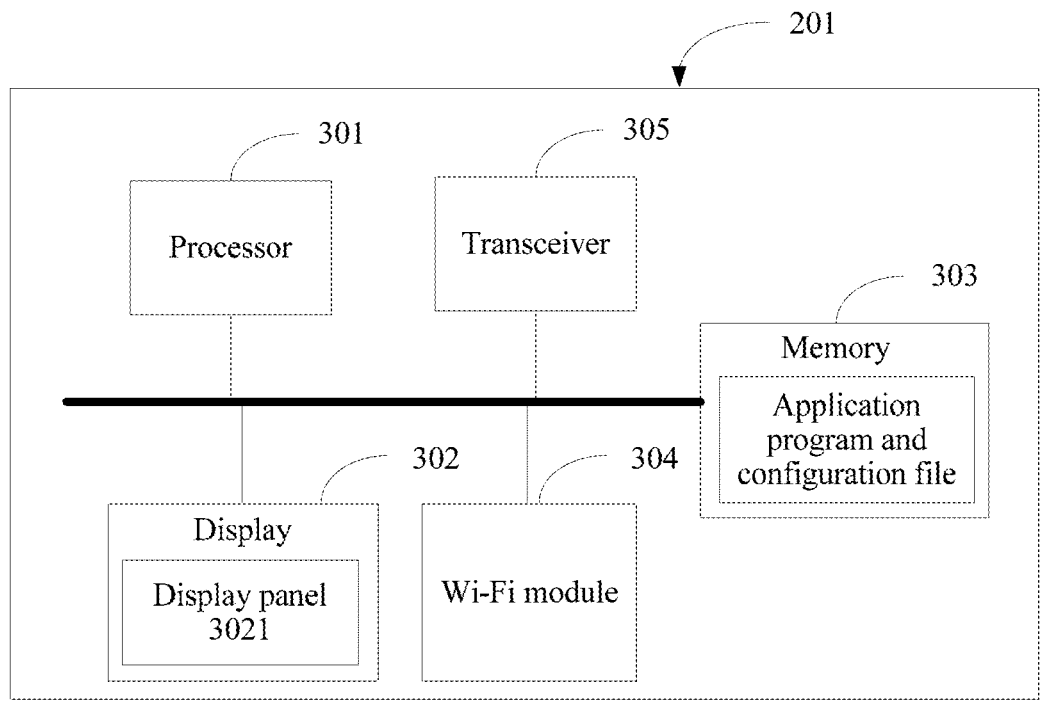
FIG. 3 is a schematic structural diagram of UE according to an embodiment of the present invention.

As shown in FIG. 3, the UE 201 shown in FIG. 2 may include a processor 301, a display 302, a memory 303, a Wi-Fi module 304, and a transceiver 305.

Various composition parts of the UE 201 are described below in detail with reference to FIG. 3.

The processor 301 is a control center of the UE 201, and may be a processor, or may be a collective name of a plurality of processing elements. For example, the processor 301 is a central processing unit (CPU), may be an application-specific integrated circuit (ASIC), or may be one or more integrated circuits such as one or more microprocessors (e.g., digital signal processor (DSP)) or one or more field programmable gate arrays (FPGA) configured to implement the embodiments of the present invention. The processor 301 may execute various functions of the UE 201 by running or executing a software program and/or a module stored in the memory 303 and invoking data stored in the memory 303.

The display 302 may be configured to display information entered by a user or information provided for a user, and various menus of the UE 201. The display 302 may include a display panel 3021. Optionally, the display panel 3021 may be configured in a form of a liquid crystal display (LCD), an organic light-emitting diode (OLED), or the like.

The memory 303 may be a volatile memory, such as a random-access memory (RAM); or a non-volatile memory (non-volatile memory), such as a read-only memory (ROM), a flash memory, a hard disk drive (HDD), or a solid-state drive (SSD); or a combination of the foregoing types of memories. The memory 303 is configured to store a related application program and configuration file that can be used to implement an access method in the present invention.

The Wi-Fi module 304 may be a module including a Wi-Fi chip and a driver of the Wi-Fi chip. The Wi-Fi chip has a capability of running a wireless Internet standard protocol.

The transceiver 305 may be a transceiver antenna of the UE 201, or a communications unit having a capability of communicating with the outside.

During specific implementation:

The Wi-Fi module 304 is configured to access a local area network of the IoT gateway 203.

The processor 301 is configured to: prompt, by using the display 302, a user to log in to the IoT cloud platform 202, and after the user logs in to the IoT cloud platform, send, in the local area network, a multicast probe message used to search for a gateway.

The transceiver 305 is configured to receive a multicast response message that is sent by the IoT gateway 203 and that includes an address of the IoT gateway 203.

The processor 301 is further configured to: communicate with the IoT cloud platform 202 by using the transceiver 305, and obtain an address of the IoT cloud platform 202 and an access identifier allocated by the IoT cloud platform 202 to the MAPP installed on the UE 201.

The processor 301 is further configured to send the address of the IoT cloud platform 202 and the access identifier to the IoT gateway 203 based on the address of the IoT gateway 203 by using the transceiver 305, so that the IoT gateway 203 sends, to the IoT cloud platform 202 based on the address of the IoT cloud platform 202, a registration message carrying the access identifier, and accesses the IoT cloud platform 202.

Figure 4:
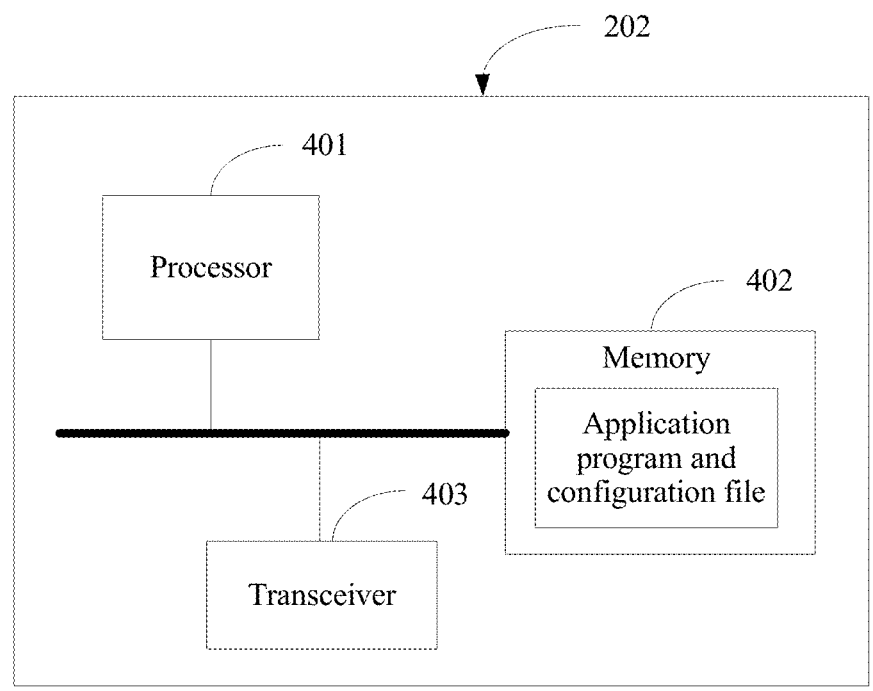
FIG. 4 is a schematic structural diagram of an IoT cloud platform according to an embodiment of the present invention.

As shown in FIG. 4, the IoT cloud platform 202 shown in FIG. 2 may include a processor 401, a memory 402, and a transceiver 403.

Various composition parts of the IoT cloud platform 202 are described below in detail with reference to FIG. 4.

The processor 401 is a control center of the IoT cloud platform 202, and may be a processor, or may be a collective name of a plurality of processing elements. For example, the processor 401 is a CPU, may be an ASIC, or may be one or more integrated circuits such as one or more DSPs or one or more FPGAs configured to implement the embodiments of the present invention. The processor 401 may execute various functions of the IoT cloud platform 202 by running or executing a software program and/or a module stored in the memory 402 and invoking data stored in the memory 402.

The memory 402 may be a volatile memory, such as a RAM; or a non-volatile memory, such as a ROM, a flash memory, an HDD, or an SSD; or a combination of the foregoing types of memories. The memory 402 is configured to store a related application program and configuration file that can be used to implement an access method in the present invention.

The transceiver 403 may be a communications unit having a capability of communicating with the outside.

During specific implementation, the various units in FIG. 4 implement the following functions of the IoT cloud platform 202 through cooperation.

The processor 401 receives, by using the transceiver 403, a registration message that is sent by the IoT gateway 203 and that includes an access identifier, binds the IoT gateway 203 to an MAPP corresponding to the access identifier in the registration message, and then sends, to the IoT gateway 203 by using the transceiver 403, a registration response message used to indicate that the IoT gateway 203 successfully accesses the IoT cloud platform 202.

Figure 5:
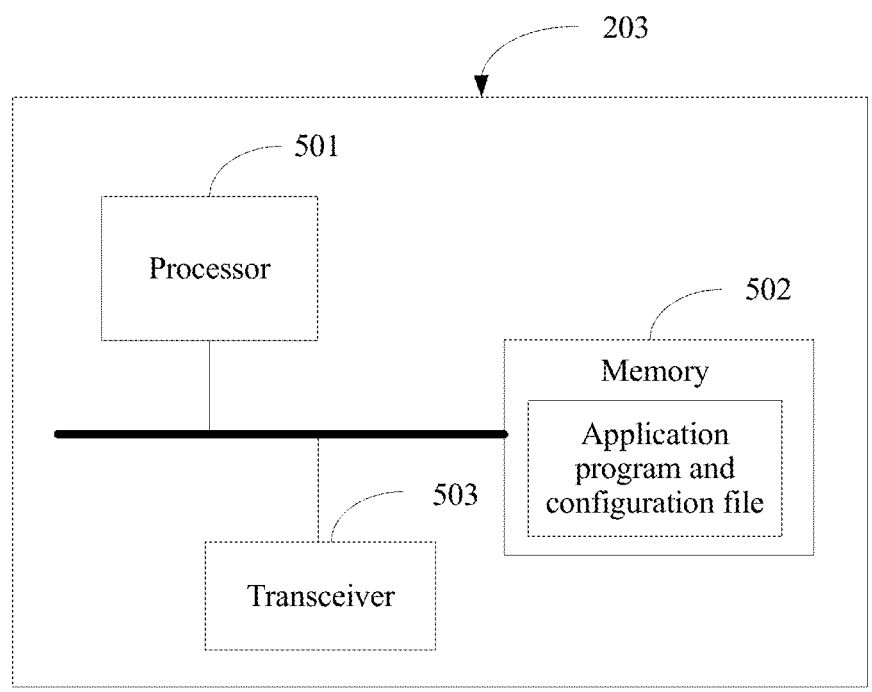
FIG. 5 is a schematic structural diagram of an IoT gateway according to an embodiment of the present invention.

As shown in FIG. 5, the IoT gateway 203 shown in FIG. 2 may include a processor 501, a memory 502, and a transceiver 503.

Various composition parts of the IoT gateway 203 are described below in detail with reference to FIG. 5.

The processor 501 is a control center of the IoT gateway 203, and may be a processor, or may be a collective name of a plurality of processing elements. For example, the processor 501 is a CPU, may be an ASIC, or may be one or more integrated circuits such as one or more DSPs or one or more FPGAs configured to implement the embodiments of the present invention. The processor 501 may execute various functions of the IoT gateway 203 by running or executing a software program and/or a module stored in the memory 502 and invoking data stored in the memory 502.

The memory 502 may be a volatile memory, such as a RAM; or a non-volatile memory, such as a ROM, a flash memory, an HDD, or an SSD; or a combination of the foregoing types of memories. The memory 402 is configured to store a related application program and configuration file that can be used to implement an access method in the present invention.

The transceiver 503 may be a communications unit having a capability of communicating with the outside.

During specific implementation, the various units in FIG. 5 implement the following functions of the IoT gateway 203 through cooperation.

The processor 501 receives, in a local area network by using the transceiver 503, a multicast probe message that is sent by the UE 201 and that is used to search for a gateway. When receiving the multicast probe message, the processor 501 sends a multicast response message including an address of the IoT gateway 203 to the UE 201 by using the transceiver 503. The processor 501 receives, by using the transceiver 503, an address of an IoT cloud platform in to which the MAPP on the UE 201 logs and an access identifier that is allocated by the IoT cloud platform to the MAPP on the UE 201 and that corresponds to the MAPP, and the address and the access identifier are sent by the UE 201. Then the processor 501 sends, by using the transceiver 503 to the IoT cloud platform in to which the MAPP on the UE 201 logs, a registration message carrying the access identifier corresponding to the MAPP on the UE 201. The registration message is used by the IoT cloud platform in to which the MAPP on the UE 201 logs to bind the IoT gateway 203 to the MAPP on the UE 201, to complete access of the IoT gateway 203 to the IoT cloud platform in to which the MAPP on the UE 201 logs.

The embodiments of the present invention are described below in detail with reference to the accompanying drawings.

The access method provided in the embodiments of the present invention may be applied to an Internet of Things, for example, the smart home field, or may be applied to the smart health field, or may be applied to the field of an Internet of Vehicles. Examples are not listed herein one by one. It should be noted that fields in which objects are connected and controlled through the Internet can all use the access method provided in the present invention, and shall all fall within the protection scope of the present invention.

It should be noted that the access method provided in the present invention is described by using only an example of a scenario of an Internet of Things in the following embodiments of the present invention, and an application scenario of the method provided in the present invention is not specifically limited. When the method in the present invention is performed in another scenario, a specific process is the same as that performed in the Internet of Things. Details are not described herein one by one again.

In one aspect, an embodiment of the present invention provides an access method, applied to the IoT network architecture shown in FIG. 2.

In a scenario in the smart home field, when constructing an IoT, a user first needs to purchase an IoT gateway and an IoT terminal. Then the IoT gateway accesses a local area network (which may be a local area network provided by the IoT gateway, or may be a local area network provided by an upper-layer router connected to the IoT gateway) by Wi-Fi. The IoT terminal is connected to the IoT gateway, an MAPP used to perform control in the IoT is installed on UE, and then access needs to be performed. The MAPP is bound to the IoT gateway, to implement access of the IoT gateway to an IoT cloud platform, so that the IoT can be connected and run. The access method provided in the present invention may be applied to the foregoing scenario. The MAPP is bound to the IoT gateway, to implement access of the IoT gateway to the IoT cloud platform, so that the IoT is connected and run.

Figures 1, 6:
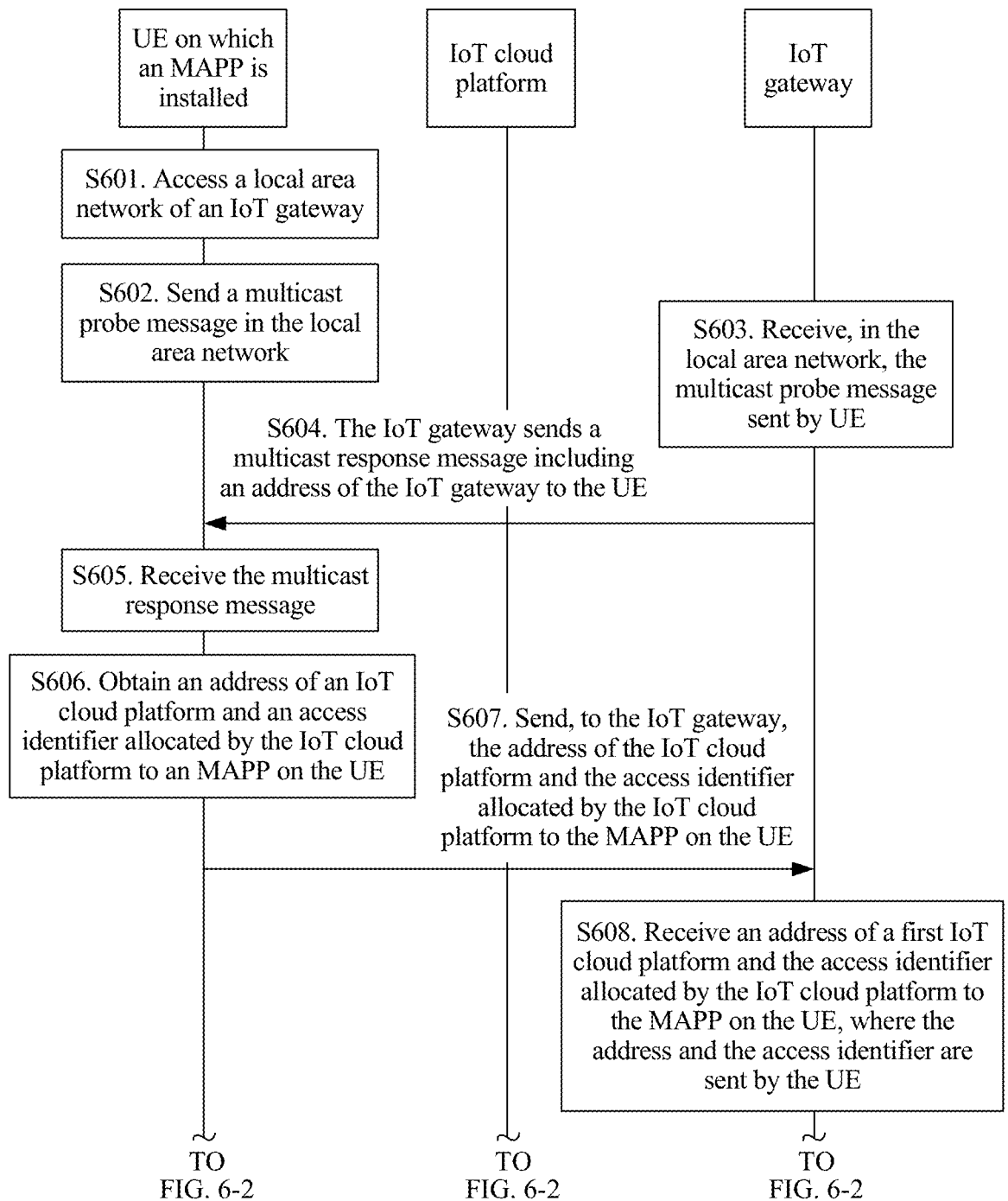
Figures 2, 6:
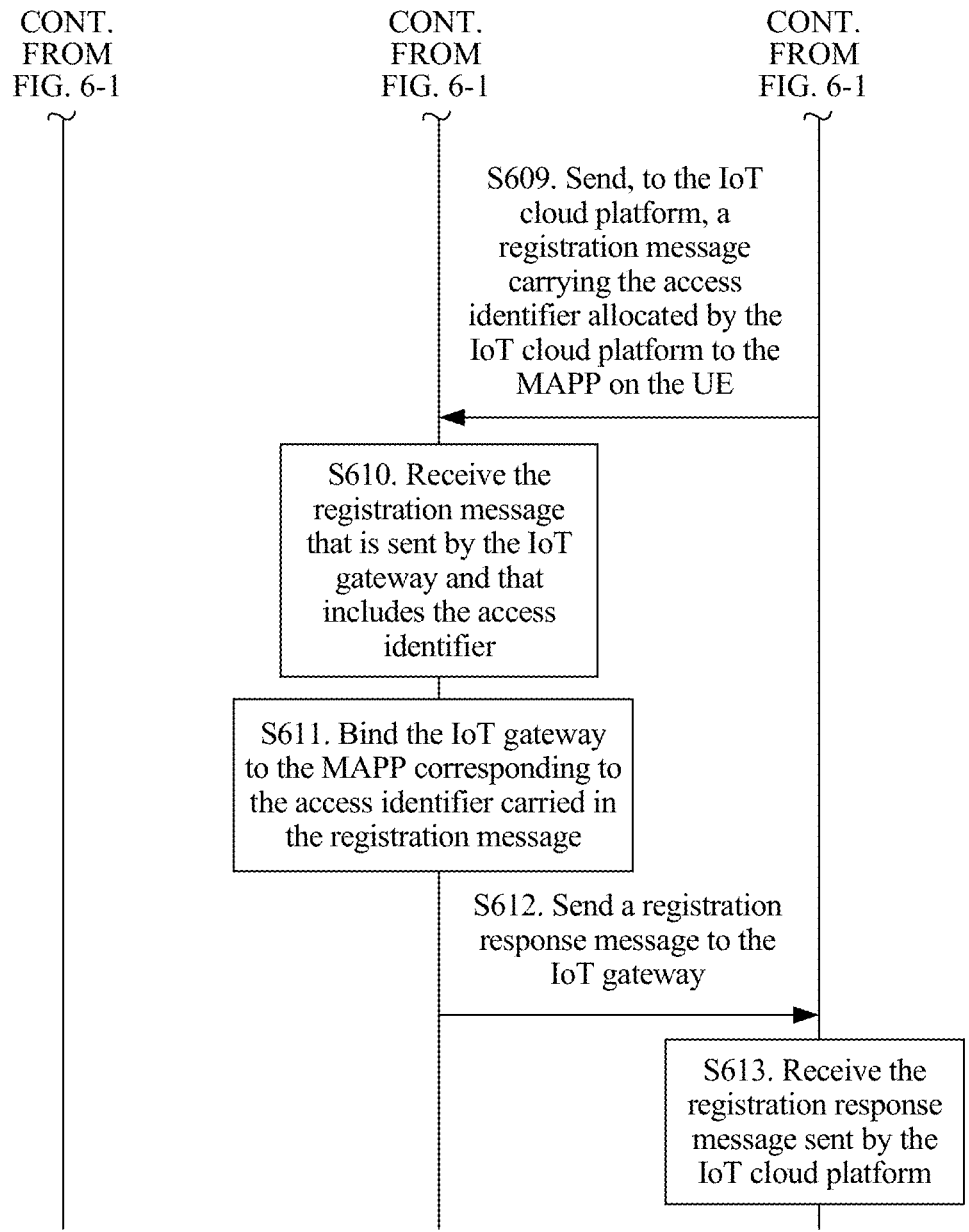

This embodiment of the present invention is applied to the IoT network architecture shown in FIG. 2. The access method provided in the present invention is described by using an example of interaction between various units in FIG. 2. As shown in FIG. 6-1 and FIG. 6-2, the method may include the following steps.

S601. UE accesses a local area network of an IoT gateway.

Optionally, that the UE accesses the local area network of the IoT gateway may be implemented by instructing a user to perform an operation on the UE, or may be implemented in another manner. This is not specifically limited in the present invention.

Optionally, a process in which the UE accesses the local area network of the IoT gateway may be clarified to a user constructing an IoT network, in usage instructions of the IoT gateway. The user implements the process under guidance of the usage instructions of the IoT gateway. Alternatively, a process in which the UE accesses the local area network of the IoT gateway may be clarified to a user constructing an IoT network in a guide of constructing the IoT. The user implements the process according to the guide. A specific manner of indicating, to the user, the process in which the UE accesses the local area network of the IoT gateway is not specifically limited in the present invention.

The process of S601 may be specifically performed in either of the following two manners.

In a first manner, a local area network provided by the IoT gateway is accessed.

Further, in the first manner, the IoT gateway needs to have a function of providing a local area network.

In a second manner, a local area network accessed by the IoT gateway is accessed.

Further, in the second manner, the local area network accessed by the IoT gateway may be a local area network generated by an upper-layer router. In this implementation, the IoT gateway may or may not have a function of providing a local area network.

Preferably, an MAPP installed on the UE is a primary MAPP in the IoT accessed by the UE. A secondary MAPP in the IoT accessed by the UE may be installed on UE of another member of the smart home IoT. An account of each secondary MAPP is allocated after the primary MAPP is bound to the IoT gateway, and does not need to be bound to the IoT gateway. Therefore, the MAPP in this embodiment of the present invention is the primary MAPP installed on the UE in the IoT network.

S602. The UE sends a multicast probe message in the local area network.

The multicast probe message is used to search for a gateway.

Optionally, S602 may be actively performed by the UE when the MAPP on the UE logs in to an IoT cloud platform, or may be performed after the user of the UE enters an instruction. This is not specifically limited in the present invention.

Specifically, to distinguish the multicast probe message from another multicast message in the local area network, a label may be added to the multicast message used to search for a gateway, to indicate that the multicast message is a multicast probe message used to search for a gateway.

It should be noted that a form and content of the label that is carried in the multicast message used to search for a gateway, to indicate that the multicast message is a multicast probe message used to search for a gateway are not specifically limited in the present invention, and may be set based on an actual requirement.

For example, when the UE sends the multicast probe message to search for a gateway, content of the sent multicast message may carry the following label: M-SEARCH*HTTP/1.1 smartHomeGateway to indicate that the multicast message is a smart home gateway (Smart Home Gateway) search message.

It should be noted that the label carried in the multicast probe message is provided only by using the foregoing example, and the content and the form of the label are not specifically limited.

It should be further noted that sending performed by the UE in this specification may be sending performed by the MAPP installed on the UE, receiving performed by the UE may be receiving performed by the MAPP installed on the UE, sending to the UE may be sending to the MAPP installed on the UE, and receiving from the UE may be receiving from the MAPP installed on the UE. Details are not subsequently described one by one again.

S603. The IoT gateway receives, in the local area network, the multicast probe message sent by the UE.

The multicast probe message is used to search for a gateway. The mobile application MAPP is installed on the UE.

Specifically, the content received by the IoT gateway in S603 is the content sent by the UE in S602.

Optionally, the local area network in S603 is a local area network accessed by both the IoT gateway and the UE. The local area network may be the local area network provided by the IoT gateway, or may be the local area network provided by the upper-layer router of the IoT gateway.

Further, in S603, when receiving, in the local area network, a multicast probe message that is sent by UE and that is used to search for a gateway, the IoT gateway performs S604.

Optionally, configuration may be performed in the IoT gateway. The IoT gateway can receive the multicast probe message only when the IoT gateway is not bound to any MAPP. When the IoT gateway is already bound to an MAPP, the IoT gateway is shielded from receiving the multicast probe message. In this way, any IoT gateway that can receive the multicast probe message is a target device to which the MAPP is to be bound, and an IoT gateway receiving the multicast probe message performs S604.

Optionally, configuration may be performed in the IoT gateway. When receiving the multicast probe message, the IoT gateway first determines whether the IoT gateway is already bound to an MAPP. If the IoT gateway is not bound to an MAPP, the IoT gateway performs S604. If the IoT gateway is already bound to an MAPP, the IoT gateway discards the received multicast probe message.

S604. The IoT gateway sends a multicast response message including an address of the IoT gateway to the UE.

Specifically, to distinguish the multicast response message from another multicast response message in the local area network, during execution of S604, in addition to the address of the IoT gateway, the multicast response message sent by the IoT gateway may carry a label, to indicate that the multicast message is a response message in response to the multicast probe message that is sent by the UE and that is used to search for a gateway.

It should be noted that a form and content of the label carried in the multicast response message sent by the IoT gateway are not specifically limited in the present invention, and may be set based on an actual requirement.

For example, when the IoT gateway sends the multicast response message, the sent multicast response message may have the following content to indicate that the multicast response message is a response message of a smart home gateway search message:

USN: uuid:null::urn:dslforum-org:device:Gateway:1.

It should be noted that the content of the multicast response message is provided only by using the foregoing example, and the content and the form of the label are not specifically limited.

S605. The UE receives the multicast response message that is sent by the IoT gateway and that includes the address of the IoT gateway.

Specifically, the content received by the UE in S605 is the content sent by the IoT gateway in S604. Details are not described herein again.

Figures 1, 6A:
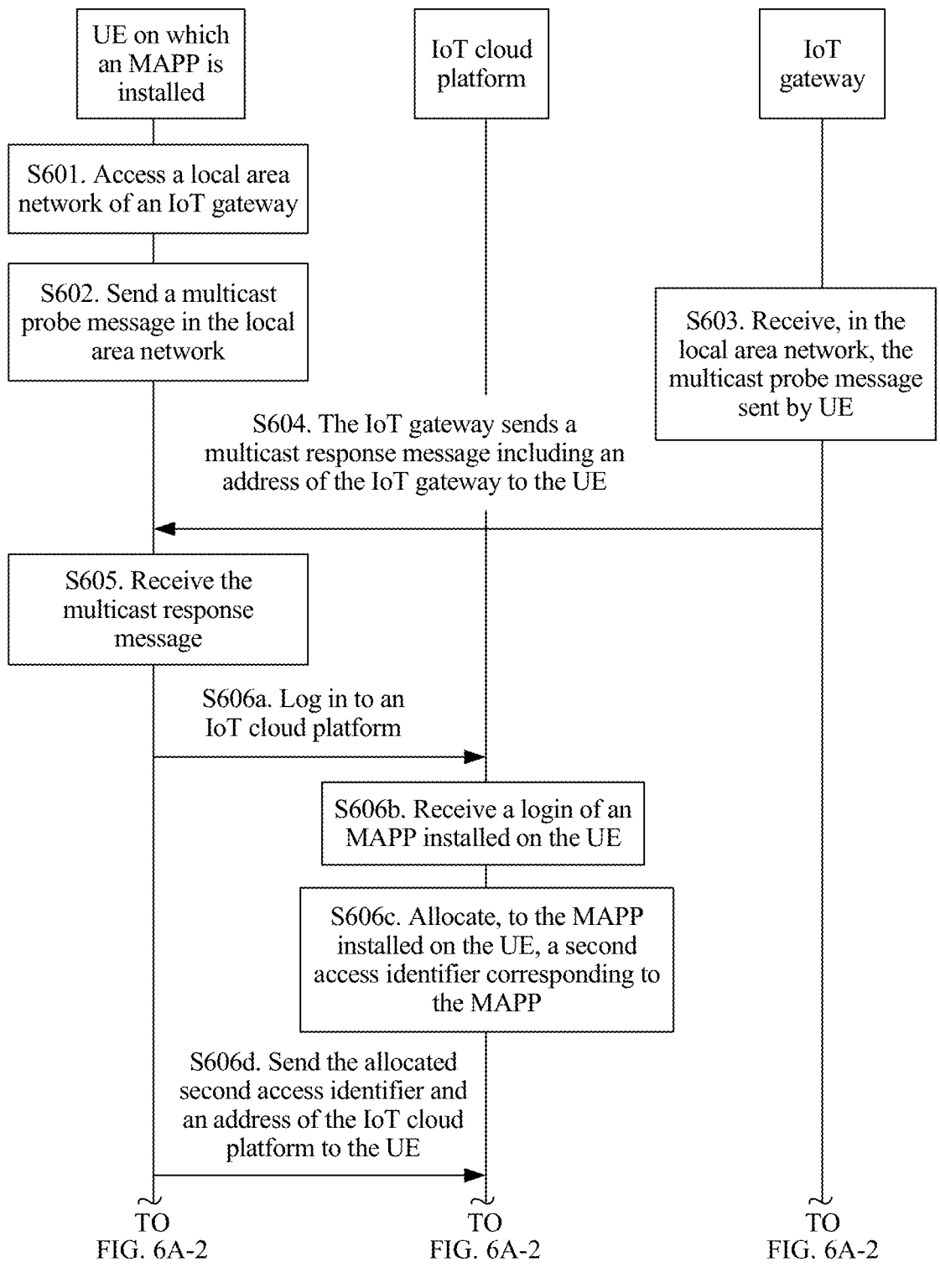
Figures 2, 6A:
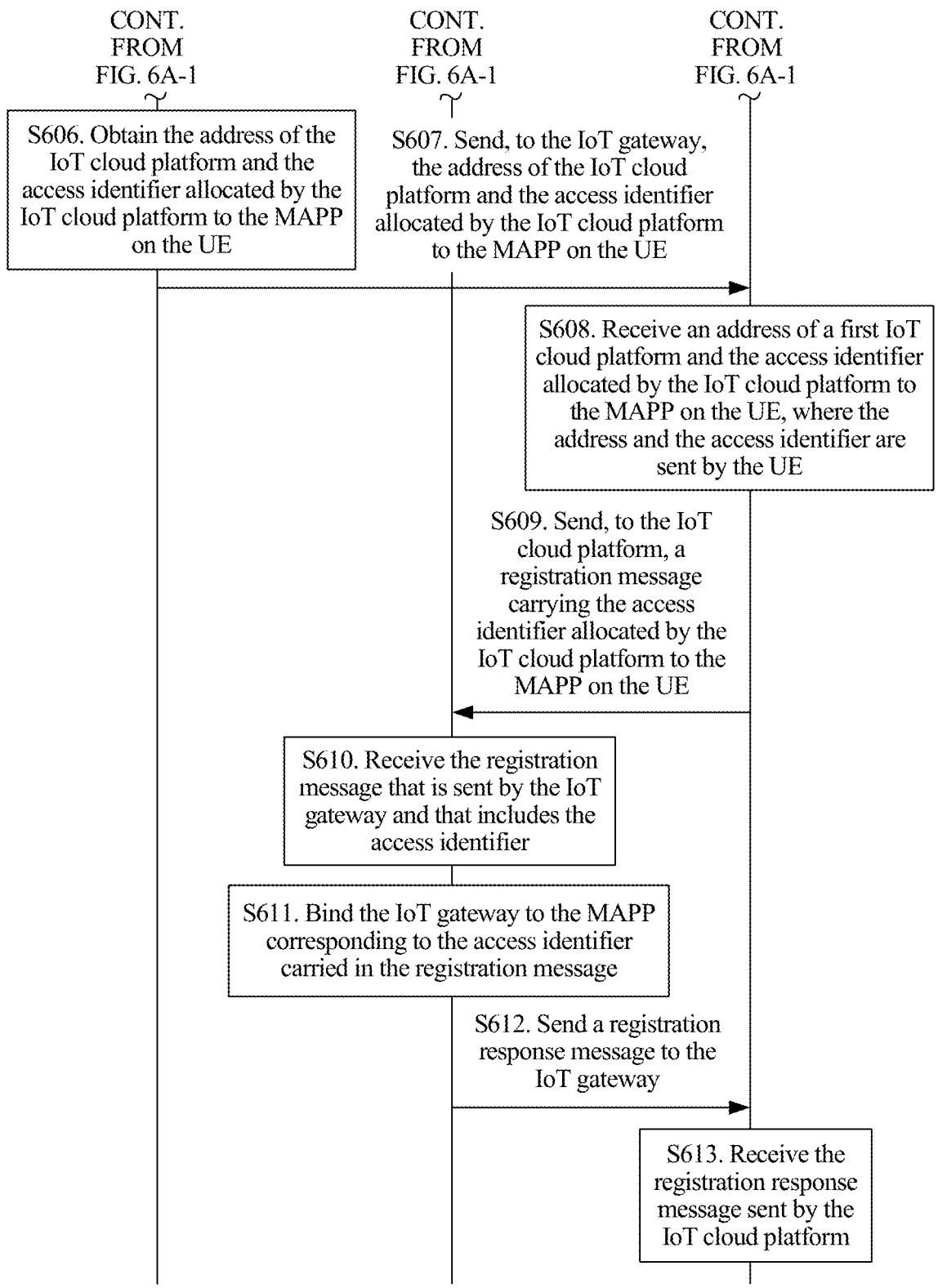

Further, optionally, as shown in FIG. 6A-1 and FIG. 6A-2, before S606 is performed, the method may further include S606a to S606d.

S606a. A user using the UE needs to log in to an IoT cloud platform by using an MAPP.

A process of logging in to the IoT cloud platform by using the MAPP is that the UE logs in to the IoT cloud platform according to an indication that is entered by the user by using the MAPP.

For example, the MAPP is an application program installed on the UE. The user may enter the MAPP by clicking an icon of the application program, log in to an interface of the IoT cloud platform by using the MAPP, enter an account number and a password, and trigger a login request operation, to send a login request to the IoT cloud platform. In this way, the user logs in to the IoT cloud platform by using the MAPP.

It should be noted that a process of logging in to the IoT cloud platform by using the MAPP is briefly described only by using the foregoing example, and the process is not specifically limited. During actual application, a login manner of logging in to the IoT cloud platform by using the MAPP may be used based on an actual requirement. This is not specifically limited in the present invention.

S606*b*. The IoT cloud platform receives a login of the MAPP installed on the UE.

Specifically, S606*a* and S606*b* are performed by exchanging a message between the MAPP on the UE and the IoT cloud platform.

Further, after S606*b* is performed, S606*c* is performed.

S606*c*. The IoT cloud platform allocates, to the MAPP installed on the UE, a second access identifier corresponding to the MAPP.

The access identifier is a unique identifier allocated by the IoT cloud platform to the MAPP. When an IoT gateway provides the access identifier and initiates registration, the IoT cloud platform may correspondingly bind the IoT gateway to the MAPP.

It should be noted that content and a form of the access identifier are not specifically limited in the present invention, and may be set based on an actual requirement.

S606*d*. The IoT cloud platform sends the allocated second access identifier and an address of the IoT cloud platform to the UE.

The address of the IoT cloud platform may be an IP address, a domain name, or the like. This is not specifically limited in the present invention. Any identifier that can uniquely identify the IoT cloud platform may be used as the address of the IoT cloud platform.

Further, during execution of S606*d*, the allocated second access identifier and the address of the IoT cloud platform may be sent to the UE in a form of a message. The message may be an existing message (for example, a login response message) or may be a created dedicated message. This is not specifically limited in the present invention.

Optionally, S606*d* may be actively performed by the IoT cloud platform. In this case, S606*d* is performed before S606. S606*d* may be performed based on a request of the UE. In this case, S606*d* is performed after S606. A process and an order of performing S606*d* are not specifically limited in the present invention.

It should be noted that S606*a* to S606*d* and S601 to S605 may be concurrently performed, or may be successively performed. When S606*a* to S606*d* and S601 to S605 are successively performed, there is no requirement for a chronological order. Only one order is shown in FIG. 6-1 and FIG. 6-2. The present invention is not specifically limited thereto.

S606. The UE obtains the address of the IoT cloud platform and the access identifier allocated by the IoT cloud platform to the MAPP on the UE.

Optionally, the process of performing S606 varies with the process of performing S606*d*, and the following two cases may be specifically included.

In a first case, the IoT cloud platform actively performs S606*d*.

In the first case, the process of performing S606 includes: directly extracting, from content sent by the IoT cloud platform, the address of the IoT cloud platform and the access identifier allocated by the IoT cloud platform to the MAPP on the UE.

In a second case, the IoT cloud platform performs S606*d* based on the request of the UE.

In the second case, the process of performing S606 includes:

sending, to the IoT cloud platform, a request message used to obtain the address of the IoT cloud platform and the access identifier allocated by the IoT cloud platform to the MAPP on the UE; and receiving the address of the IoT cloud platform and the access identifier allocated by the IoT cloud platform to the MAPP on the UE, where the address and the access identifier are sent by the IoT cloud platform.

S607. The UE sends, to the IoT gateway based on the address of the IoT gateway, the address of the IoT cloud platform and the access identifier allocated by the IoT cloud platform to the MAPP on the UE.

In S607, the content sent by the UE to the IoT gateway is used by the IoT gateway to send, to the IoT cloud platform based on the address of the IoT cloud platform, a registration message carrying the access identifier allocated by the IoT cloud platform to the MAPP on the UE, to access the IoT cloud platform.

Further, during execution of S607, the address of the IoT cloud platform and the access identifier allocated by the IoT cloud platform to the MAPP on the UE may be sent to the IoT gateway in a form of a message. The message may be an existing message or may be a created dedicated message. This is not specifically limited in the present invention.

S608. The IoT gateway receives an address of a first IoT cloud platform and the access identifier allocated by the IoT cloud platform to the MAPP on the UE, where the address and the access identifier are sent by the UE.

The first IoT cloud platform is an IoT cloud platform in to which the UE logs by using the MAPP.

Specifically, the content received by the IoT gateway in S608 is the content sent by the UE in S607. Details are not described herein again.

S609. The IoT gateway sends, to the first IoT cloud platform based on the address of the first IoT cloud platform, a registration message carrying the access identifier allocated by the IoT cloud platform to the MAPP on the UE.

The registration message sent by the IoT gateway is used by the first IoT cloud platform to bind the IoT gateway to the MAPP corresponding to the access identifier carried in the registration message, to complete access of the IoT gateway to the first IoT cloud platform.

It should be noted that a form of the registration message may be set based on an actual requirement. This is not specifically limited in the present invention.

S610. The IoT cloud platform receives the registration message that is sent by the IoT gateway and that includes the access identifier.

Specifically, the content received by the IoT cloud platform in S610 is the content sent by the IoT gateway in S609. Details are not described herein again.

S611. The IoT cloud platform binds the IoT gateway to the MAPP corresponding to the access identifier carried in the registration message.

The access identifier carried in the registration message sent by the IoT gateway is allocated by the IoT cloud platform to the MAPP, and is provided for the IoT gateway by the UE on which the MAPP is installed. When receiving a registration message carrying an access identifier, the IoT cloud platform may learn, based on the access identifier carried in the registration message, of an MAPP (an MAPP corresponding to the access identifier carried in the registration message) to which an IoT gateway sending the registration message needs to be bound, and then bind, to the MAPP corresponding to the access identifier carried in the registration message, the IoT gateway sending the registration message, to complete access of the IoT gateway.

Specifically, when allocating, to the MAPP on the UE that performs login, the access identifier corresponding to the MAPP, the IoT cloud platform records an access identifier corresponding to each MAPP. When performing S611, the IoT cloud platform may directly learn of the MAPP corresponding to the access identifier included in the registration message, and bind, to the MAPP, the IoT gateway sending the registration message.

Optionally, to perform S611, there may be the following two implementation solutions based on different scenarios.

First implementation solution: The MAPP installed on the UE is still not bound to any IoT gateway, and is bound for the first time. In other words, the MAPP corresponding to the access identifier carried in the registration message is not bound to a gateway. In this case, the process of S611 may include:

directly binding, to the MAPP corresponding to the access identifier carried in the registration message, the IoT gateway sending the registration message.

Second implementation solution: The MAPP installed on the UE is already bound to an IoT gateway, and the IoT gateway needs to be replaced due to a failure of the bound IoT gateway or for another reason. The registration message is sent by an IoT gateway with which the bound IoT gateway is replaced. In other words, the MAPP corresponding to the access identifier carried in the registration message is already bound to a gateway. In this case, the process of S611 may include:

first unbinding, from an original gateway, the MAPP corresponding to the access identifier carried in the registration message, and then binding, to the MAPP corresponding to the access identifier carried in the registration message, the IoT gateway sending the registration message.

S612. The IoT cloud platform sends a registration response message to the IoT gateway.

The registration response message sent by the IoT cloud platform indicates that the IoT gateway successfully accesses the IoT cloud platform.

S613. The IoT gateway receives the registration response message sent by the IoT cloud platform.

So far, the solution of S601 to S613 provided in the present invention is performed, to complete access of the IoT gateway.

In the access method provided in this embodiment of the present invention, the UE on which the MAPP is installed and the to-be-connected IoT gateway access the same local area network, so that the UE obtains the address of the to-be-connected IoT gateway by using a multicast message function of the local area network. The IoT cloud platform allocates, to the MAPP on the UE, the unique access identifier corresponding to the MAPP, so that the IoT gateway bound to the MAPP performs access. The UE provides, for the IoT gateway whose address is already learned, the address of the IoT cloud platform and the access identifier allocated by the IoT cloud platform to the MAPP on the UE, so that the IoT gateway obtains the address of the IoT cloud platform, adds, to the registration message, the access identifier allocated by the IoT cloud platform to the MAPP on the UE, and sends the registration message to the IoT cloud platform. The IoT cloud platform binds the IoT gateway sending the registration message to the MAPP corresponding to the access identifier included in the registration message, so as to complete access of the IoT gateway. In the access process, because the address of the IoT cloud platform is obtained by the UE and is then provided for the IoT gateway, there is no requirement for a version of the IoT gateway in the access process, facilitating all of production and marketing of the gateway and use of the user, so that compatibility of the IoT gateway is substantially improved. In addition, the IoT gateway initiates registration to the IoT cloud platform once only when the IoT gateway receives the address of the IoT cloud platform and the access identifier that are sent by the UE. Therefore, IoT cloud platform resources are greatly reduced, and processing performance of the IoT cloud platform is improved.

For example, it is assumed that a user A purchases an IoT gateway 1, a monitoring camera 2, and a temperature sensor 3, to construct an Internet of Things at home. The user A connects the monitoring camera 2 and the temperature sensor 3 to the IoT gateway 1, and connects the IoT gateway 1 to a local area network provided by a router at home. A process in the present invention is performed below to describe an access process of the IoT gateway during construction of the Internet of Things.

The user A first installs an MAPP on a mobile phone B, and connects the mobile phone B to the local area network provided by the router at home. Therefore, the mobile phone B and the IoT gateway 1 access the same local area network.

The user A performs an operation on an interface of the MAPP to log in to an IoT cloud platform. After the user A logs in to the IoT cloud platform by using the MAPP, the mobile phone B sends, in the local area network, a multicast probe message used to search for a gateway. The mobile phone B receives an address of the IoT cloud platform and an access identifier field X allocated to the MAPP that are sent by the IoT cloud platform.

Because the IoT gateway 1 and the mobile phone B currently used by the user A are in the same local area network, the IoT gateway 1 receives the multicast probe message that is sent by the mobile phone B in the local area network and that is used to search for a gateway, and returns a multicast response message including an address of the IoT gateway 1 to the mobile phone B, so that the mobile phone B obtains the address of the IoT gateway 1.

The mobile phone B sends, to the IoT gateway 1 based on the address of the IoT gateway 1 that is included in the multicast response message, the address of the IoT cloud platform and the field X that are sent by the IoT cloud platform, so that the IoT gateway 1 obtains the address of the IoT cloud platform and the field X.

The IoT gateway 1 sends a registration message including the field X to the IoT cloud platform based on the obtained address of the IoT cloud platform.

When receiving the registration message including the field X, the IoT cloud platform binds the IoT gateway 1 to the MAPP that is on the mobile phone B and that corresponds to the field X, to complete access of the IoT gateway 1.

Figure 7:
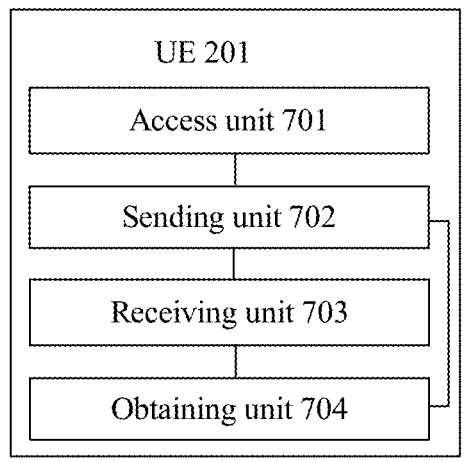
FIG. 7 is a schematic structural diagram of another UE according to an embodiment of the present invention.

In another aspect, an embodiment of the present invention provides another UE 201. An MAPP is installed on the UE. As shown in FIG. 7, the UE 201 may include:

an access unit 701, configured to access a local area network of an IoT gateway;

a sending unit 702, configured to send a multicast probe message in the local area network accessed by the access unit 701, where the multicast probe message is used to search for a gateway;

a receiving unit 703, configured to receive a multicast response message that is sent by the IoT gateway in the same local area network and that includes an address of the IoT gateway; and an obtaining unit 704, configured to obtain an address of an IoT cloud platform in to which the UE logs and an access identifier allocated by the IoT cloud platform to the MAPP installed on the UE.

The sending unit 702 is further configured to send, to the IoT gateway based on the address of the IoT gateway in the multicast response message received by the receiving unit 703, the address of the IoT cloud platform and the access identifier that are obtained by the obtaining unit 704, so that the IoT gateway sends, to the IoT cloud platform based on the address of the IoT cloud platform, a registration message carrying the access identifier, and accesses the IoT cloud platform.

Optionally, the access unit 701 may be specifically configured to:
access a local area network provided by the IoT gateway; or
access a local area network accessed by the IoT gateway.

Figure 8:
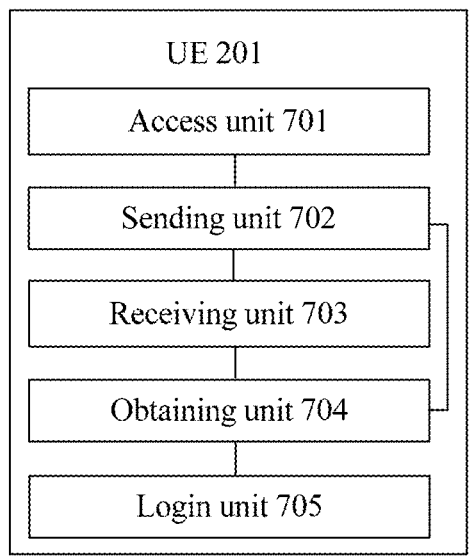
FIG. 8 is a schematic structural diagram of still another UE according to an embodiment of the present invention.

Further, referring to FIG. 8, the UE 201 may further include:
a login unit 705, configured to log in to the IoT cloud platform according to an indication that is entered by a user of the UE 201 by using the MAPP installed on the UE.

Figure 9:
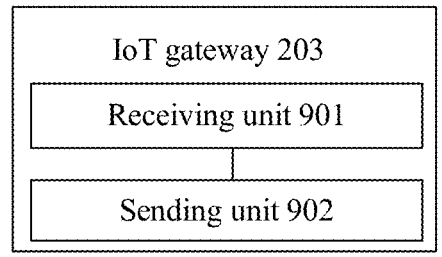
FIG. 9 is a schematic structural diagram of another IoT gateway according to an embodiment of the present invention.

In still another aspect, an embodiment of the present invention provides another IoT gateway 203. As shown in FIG. 9, the IoT gateway 203 may include:
a receiving unit 901, configured to receive, in a local area network, a multicast probe message sent by UE, where the multicast probe message is used to search for a gateway, and an MAPP is installed on the UE; and
a sending unit 902, configured to: when the multicast probe message sent by the UE is received, send a multicast response message including an address of the IoT gateway 203 to the UE.

The receiving unit 901 may be further configured to receive an address of a first IoT cloud platform and an access identifier allocated by the first cloud platform to the MAPP, where the address and the access identifier are sent by the UE, and the first IoT cloud platform is an IoT cloud platform in to which the UE logs by using the MAPP.

The sending unit 902 may be further configured to send, to the first IoT cloud platform based on the address of the first IoT cloud platform that is received by the receiving unit 901, a registration message carrying the access identifier, where the registration message is used by the first IoT cloud platform to bind the IoT gateway to the MAPP, to complete access of the IoT gateway to the first IoT cloud platform.

Optionally, the local area network may be a local area network provided by the IoT gateway; or the local area network may be a local area network accessed by the IoT gateway.

Figure 10:
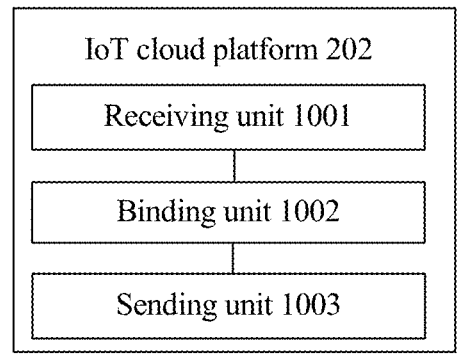
FIG. 10 is a schematic structural diagram of another IoT cloud platform according to an embodiment of the present invention.

In still another aspect, an embodiment of the present invention provides another IoT cloud platform 202. As shown in FIG. 10, the IoT cloud platform 202 may include:
a receiving unit 1001, configured to receive a registration message that is sent by an IoT gateway and that includes a first access identifier;
a binding unit 1002, configured to bind, to an MAPP corresponding to the first access identifier included in the registration message, the IoT gateway sending the registration message received by the receiving unit 1001; and
a sending unit 1003, configured to send a registration response message to the IoT gateway, where the registration response message indicates that the IoT gateway successfully accesses the IoT cloud platform.

Further, the binding unit 1002 may be specifically configured to:
if the MAPP corresponding to the first access identifier is not bound to a gateway, directly bind the IoT gateway to the MAPP corresponding to the first access identifier; or if the MAPP corresponding to the first access identifier is already bound to a gateway, first unbind the MAPP corresponding to the first access identifier from the original gateway, and then bind the IoT gateway to the MAPP corresponding to the first access identifier.

Further, the receiving unit 1001 may be further configured to receive a login of the MAPP installed on UE.

Figure 11:
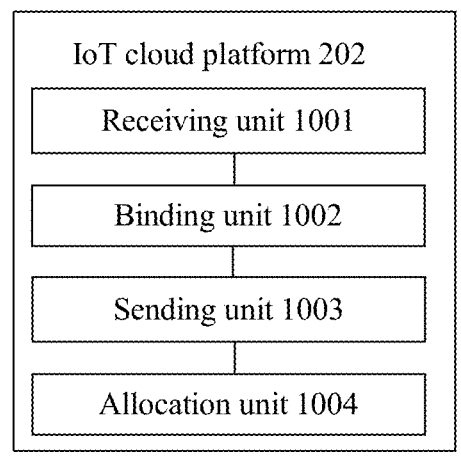
FIG. 11 is a schematic structural diagram of still another IoT cloud platform according to an embodiment of the present invention.

Further, referring to FIG. 11, the IoT cloud platform 202 may further include an allocation unit 1004, configured to allocate, to the MAPP installed on the UE, a second access identifier corresponding to the MAPP; and
the sending unit 1003 may be further configured to send the second access identifier allocated by the allocation unit 1004 and an address of the IoT cloud platform to the UE.

The UE 201, the IoT cloud platform 202, and the IoT gateway 203 that are provided in the embodiments of the present invention are configured to perform, through interaction, the access method in the embodiment shown in FIG. 6-1 and FIG. 6-2 or FIG. 6A-1 and FIG. 6A-2. Therefore, effects that are the same as those of the embodiment shown in FIG. 6-1 and FIG. 6-2 or FIG. 6A-1 and FIG. 6A-2 can be achieved.

In still another aspect, an embodiment of the present invention provides an access system 120. The access system 120 may include:
at least one UE 201 according to any one of the foregoing embodiments;
at least one IoT gateway 203 according to any one of the foregoing embodiments; and
at least one IoT cloud platform 202 according to any one of the foregoing embodiments.

The access system 120 provided in this embodiment of the present invention is configured to perform the access method in the embodiment shown in FIG. 6-1 and FIG. 6-2 or FIG. 6A-1 and FIG. 6A-2. Therefore, effects that are the same as those of the embodiment shown in FIG. 6-1 and FIG. 6-2 or FIG. 6A-1 and FIG. 6A-2 can be achieved.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An access method by a user equipment (UE) having a mobile application (MAPP) installed thereon, the method comprising:
    accessing a local area network comprising an Internet of Things (IoT) gateway;
    sending a multicast probe message in the local area network for searching for the IoT gateway;
    receiving a multicast response message sent by the IoT gateway, wherein the multicast response comprises an address of the IoT gateway;
    obtaining an address of an IoT cloud platform and an access identifier allocated by the IoT cloud platform to the MAPP; and
    sending the address of the IoT cloud platform and the access identifier to the IoT gateway based on the address of the IoT gateway to enable the IoT gateway to send a registration message to the IoT cloud platform based on the address of the IoT cloud platform, wherein the registration message carries the access identifier to access the IoT cloud platform, wherein the access identifier is used to enable the IoT cloud platform to bind the IoT gateway to the MAPP.

2. The method according to claim 1, wherein accessing the local area network comprising the IoT gateway comprises:
    accessing a wireless local area network provided by the IoT gateway; or
    accessing a wireless local area network accessed by the IoT gateway.

3. The method according to claim 1, wherein before obtaining the address of the IoT cloud platform and the access identifier allocated by the IoT cloud platform, the method further comprises:
    logging in to the IoT cloud platform according to an indication that is entered by a user of the UE by using the MAPP.

4. An access method by an Internet of Things (IoT) gateway, the method comprising:
    receiving, in a local area network, a multicast probe message from a user equipment (UE), wherein the multicast probe message is used to search for a gateway;
    in response to receiving the multicast probe message, sending a multicast response message comprising an address of the IoT gateway to the UE;
    receiving an address of a first IoT cloud platform and an access identifier allocated by the first IoT cloud platform to a mobile application (MAPP) installed on the UE, wherein the address and the access identifier are received from the UE, and the first IoT cloud platform is an IoT cloud platform in to which the UE logs by using the MAPP; and
    sending, to the first IoT cloud platform based on the address of the first IoT cloud platform, a registration message carrying the access identifier to enable the first IoT cloud platform to bind the IoT gateway to the MAPP, and to complete access of the IoT gateway to the first IoT cloud platform.

5. The method according to claim 4, wherein:
    the local area network is a wireless local area network provided by the IoT gateway; or
    the local area network is a wireless local area network accessed by the IoT gateway.

6. An access method by an Internet of Things (IoT) cloud platform, the method comprising:
    receiving login information of a mobile application (MAPP) installed on a user equipment (UE);
    allocating to the MAPP an access identifier corresponding to the MAPP;
    sending the access identifier and an address of the IoT cloud platform to the UE;
    receiving a registration message from an IoT gateway, wherein the registration message comprises the access identifier, wherein the address of the IoT cloud platform and the access identifier are received by the IoT gateway from the UE;
    binding the IoT gateway to the MAPP corresponding to the access identifier; and
    sending a registration response message to the IoT gateway, wherein the registration response message indicates that the IoT gateway successfully accesses the IoT cloud platform.

7. The method according to claim 6, wherein binding the IoT gateway to the MAPP corresponding to the access identifier comprises:
    when the MAPP corresponding to the access identifier is not bound to a gateway, directly binding the IoT gateway to the MAPP corresponding to the access identifier; and
    when the MAPP corresponding to the access identifier is already bound to an original gateway, first unbinding the MAPP corresponding to the access identifier from the original gateway, and then binding the IoT gateway to the MAPP corresponding to the access identifier.

8. A system, comprising:
    an Internet of Things (IoT) gateway; and
    an IoT cloud platform,
    wherein the IoT cloud platform is configured to receive login information of a mobile application (MAPP) installed on a user equipment (UE), allocate to the MAPP an access identifier corresponding to the MAPP, and send the access identifier and an address of the IoT cloud platform to the UE;

wherein the IoT gateway is configured to receive the address of the IoT cloud platform and the access identifier from the UE, and send to the IoT cloud platform based on the address of the IoT cloud platform, a registration message carrying the access identifier; and wherein the IoT cloud platform is further configured to receive the registration message, bind the IoT gateway to the MAPP corresponding to the access identifier, and send a registration response message to the IoT gateway, wherein the registration response message indicates that the IoT gateway successfully accesses the IoT cloud platform.

9. The system of claim 8, wherein the IoT cloud platform is further configured to:

when the MAPP corresponding to the access identifier is not bound to a gateway, directly bind the IoT gateway to the MAPP corresponding to the access identifier; or when the MAPP corresponding to the access identifier is already bound to an original gateway, first unbind the MAPP corresponding to the access identifier from the original gateway, and then bind the IoT gateway to the MAPP corresponding to the access identifier.

10. The system of claim 8, wherein the IoT gateway is further configured to:

receive, in a local area network, a multicast probe message sent by the UE, wherein the multicast probe message is used to search for a gateway; and send a multicast response message comprising an address of the IoT gateway to the UE.

11. The system of claim 10, wherein:

the local area network is a wireless local area network provided by the IoT gateway; or the local area network is a wireless local area network accessed by the IoT gateway.

* * * * *